United States Patent [19]
Tsai

[11] Patent Number: 6,139,035
[45] Date of Patent: Oct. 31, 2000

[54] BRAKE DEVICE FOR A SKATE CART

[76] Inventor: Shui-Te Tsai, No. 14, Lane 69, Tian Jin Road Section 4, Pei Tun Dist., Taichung City, Taiwan

[21] Appl. No.: 09/479,655

[22] Filed: Jan. 10, 2000

[51] Int. Cl.⁷ .................................................. A63C 17/04
[52] U.S. Cl. .................................. 280/87.041; 280/11.201
[58] Field of Search .................... 280/87.041, 87.042, 280/87.043, 263, 287, 655.1, 11.201; 188/19, 72.1, 77.2

[56] References Cited

U.S. PATENT DOCUMENTS

| 3,006,659 | 10/1961 | Krasnoff et al. | 280/87.041 |
| 4,394,029 | 7/1983 | Holmgren | 280/87.041 |
| 5,927,733 | 7/1999 | Banda | 280/87.041 |

FOREIGN PATENT DOCUMENTS 0396141  4/1999  France ............................... 280/87.041

*Primary Examiner*—Richard M. Camby
*Attorney, Agent, or Firm*—Browdy and Neimark; Sheridan Neimark

[57] ABSTRACT

A brake device for a skate cart includes a rear wheel hood pivotally connected to the frame of the skate cart and the rear wheel hood has a curved engaging inside so as to contact the rear wheel of the skate cart and stop the skate cart. A resilient member has one end thereof connected to the rear wheel hood and the other end of the resilient member is connected to the frame. When stepping on the rear wheel hood, the rear wheel hood is pivoted to contact the rear wheel and when removing the foot from the rear wheel hood, the rear wheel hood returns by the resilient member.

7 Claims, 3 Drawing Sheets

BRAKE DEVICE FOR A SKATE CART

FIELD OF THE INVENTION

The present invention relates to a brake device for a skate cart and includes a resilient member connected to a rear wheel hood which is pivotally connected to the frame of the skate cart so that when stepping on the rear wheel hood, the rear wheel is stopped by the hood and the hood returns by the resilient member when the user removes his/her foot from the rear wheel hood.

BACKGROUND OF THE INVENTION

A conventional skate cart generally includes a frame with a front wheel and a rear wheel. A steerer tube is connected to the front wheel and a handlebar assembly is connected to the steerer tube so that when rotating the handlebar assembly, the skate cart turns accordingly. A conventional brake device is employed to stop the rear wheel and the brake device is similar to that of a bicycle. In other words, the conventional brake device uses a brake cable connected between the rear wheel rim and a brake lever on the handlebar assembly, and the other brake cable is connected between the other brake lever and the front wheel rim. When pulling the levers, the brake device is actuated by the brake cables to stop the front wheel and the rear wheel. However, the brake cables could be tangled by the handlebar assembly and it requires a lot of parts for the brake device.

The present invention intends to provide a brake device for a skate cart wherein the rear wheel has a pivotal rear wheel hood connected with a resilient member so that the rear wheel hood is pivoted to contact the rear wheel by stepping on the hood and the hood returns by the resilient member when the user removes his/her foot from the rear wheel hood.

SUMMARY OF THE INVENTION

In accordance with one aspect of the present invention, there is provided a brake device for a skate cart. The skate cart includes a frame with a front wheel and a rear wheel respectively connected to two ends of the frame. A handlebar assembly is operationally connected to the front wheel. The brake device includes a rear wheel hood pivotally connected to the frame and a resilient member is connected between the rear wheel hood and the frame.

The object of the present invention is to provide a brake device for a skate cart, wherein the brake device uses a rear wheel hood which is used to contact the rear wheel to stop the skate cart.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
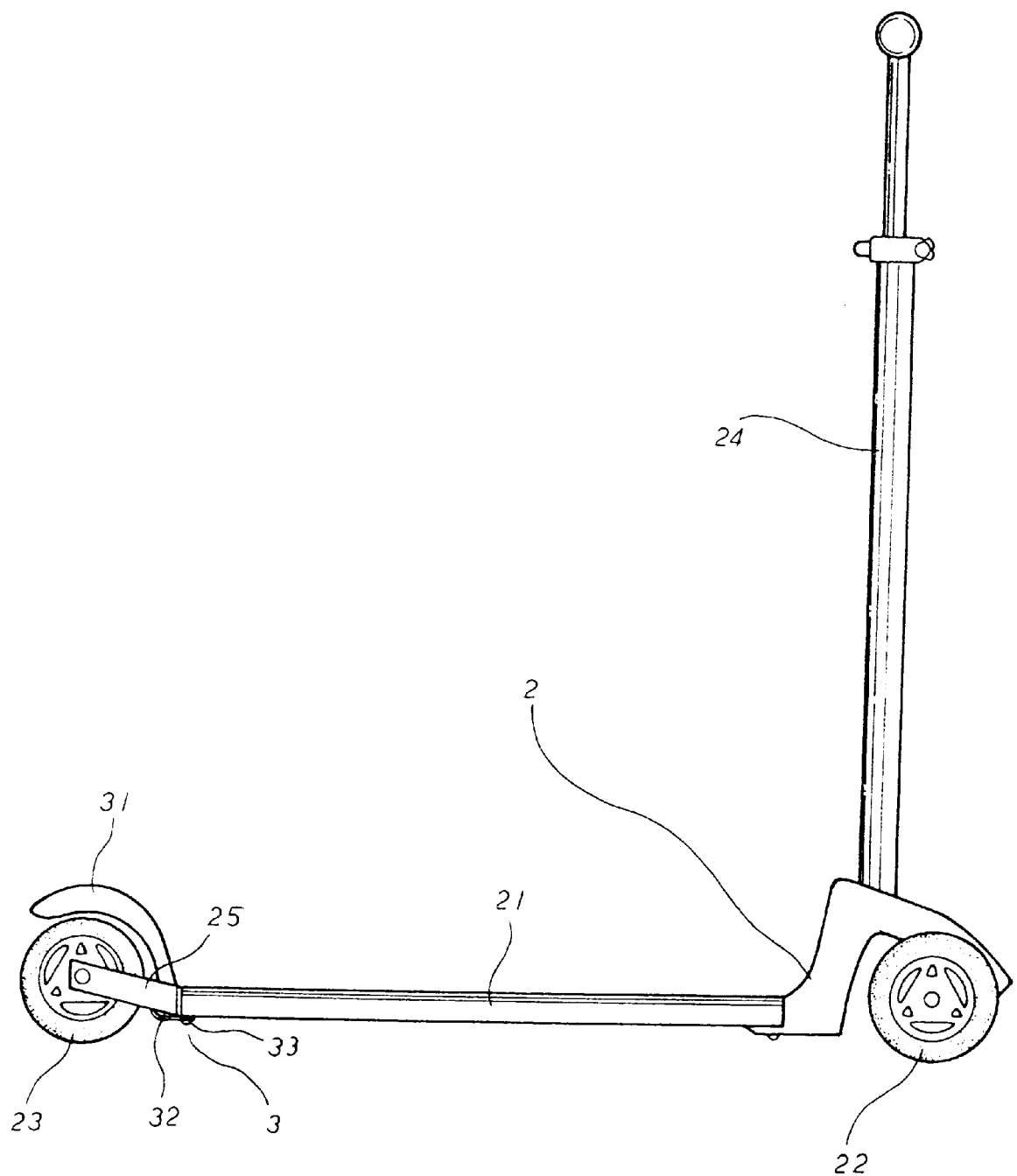
FIG. 1 is a side view to show a skate cart with a brake device in accordance with the present invention.
Figure 2:
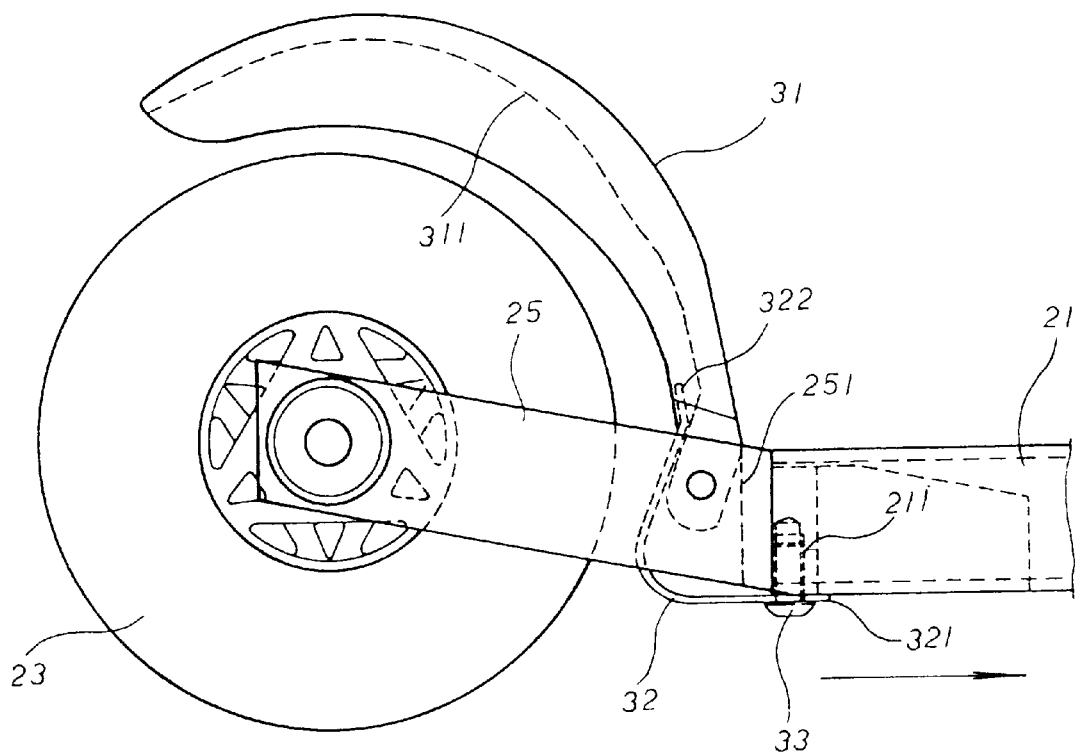
FIG. 2 is an illustrative view to show the rear wheel hood and the resilient member wherein the rear wheel hood is not yet pushed toward the rear wheel.

Referring to FIGS. 1 and 2, the skate cart includes a frame 21, a front wheel 22 connected to the front end of the frame 21 by a connection member 2, and a rear wheel 23 is connected to the rear end of the frame 21 by two rear stays 25. A handlebar assembly 24 is operationally connected to the connection member 2 so that when turning the handlebar assembly 24, the front wheel 22 turns.

A rear wheel hood 31 is pivotally connected to the frame 21 by extending a bolt 33 through the rear wheel hood 31 and threadedly engaged with a hole 211 defined in the frame 21. A resilient member 32 has one end 321 thereof connected to the rear wheel hood 31 and the other end 322 of the resilient member 32 is connected to the frame 21. The rear wheel hood 31 has a curved engaging inside 311 which is used to contact the rear wheel 23 to stop the rear wheel 23.

Figure 3:
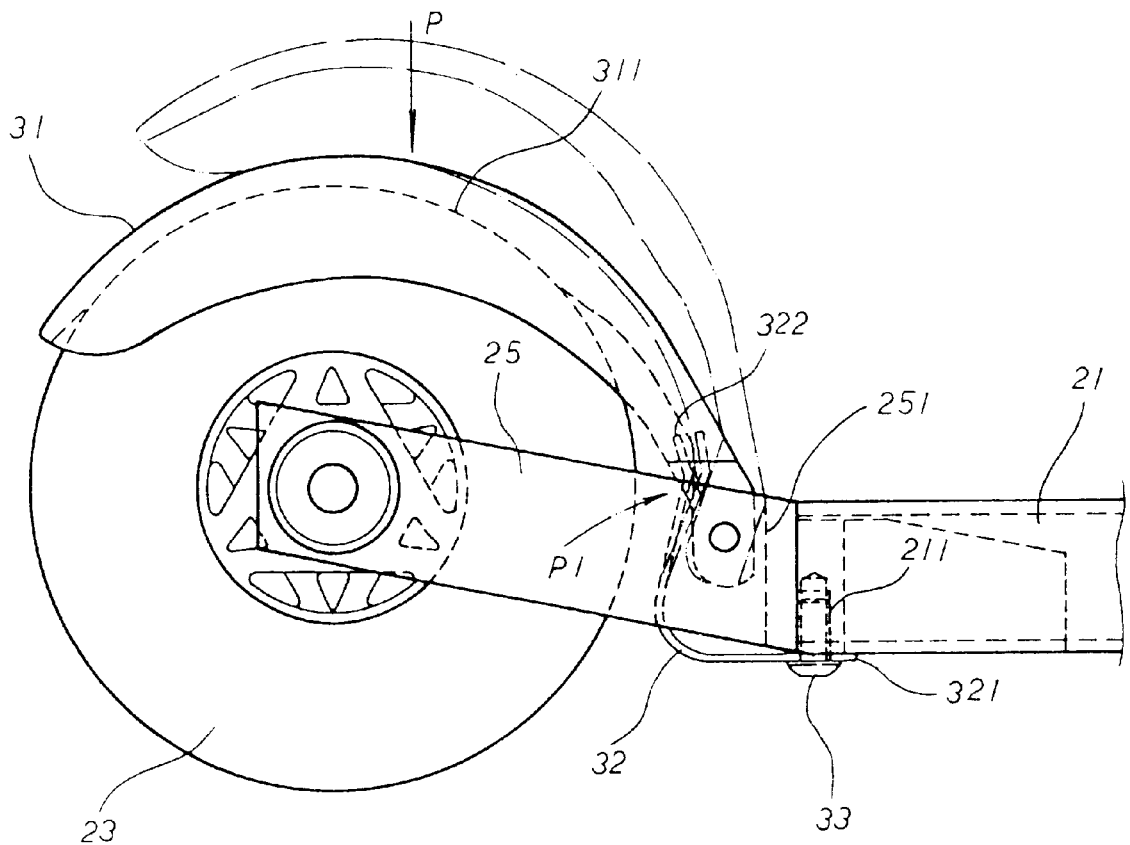
FIG. 3 is an illustrative view to show the rear wheel hood and the resilient member wherein the rear wheel hood is stopped by the rear wheel hood.

As shown in FIG. 3, when stopping the skate cart, a force "P" is applied to the rear wheel hood 31 by the rider's foot, the rear wheel hood 31 is then pivoted to let the curved engaging inside 311 contact the rear wheel 23 to stop the rear wheel 23. When the force "P" is released, the rear wheel hood 31 returns by the force of the resilient member 32. It is to be noted that the rear end of the frame 21 has a limiting end 251 so as to prevent the rear wheel hood 31 from over-turning.

The brake device in accordance with the present invention has no brake cables and complicated structure. The brake device is simple and easy to operate.

While we have shown and described various embodiments in accordance with the present invention, it should be clear to those skilled in the art that further embodiments may be made without departing from the scope and spirit of the present invention.

What is claimed is:

1. A skate cart comprising a frame, a front wheel and a rear wheel respectively connected to two ends of said frame, a handlebar assembly operationally connected to said front wheel, and
   a rear wheel hood having a front end and a rear end, said front end having a pivotal connection whereby said front end is pivotally connected to said frame and said rear end is vertically movable when said rear wheel hood pivots with respect to said frame, a resilient member having one end thereof engaged with said rear wheel hood adjacent said pivotal connection, and the other end of said resilient member connected to said frame, said resilient member biasing said rear wheel hood away from said rear wheel with the rear end of said rear wheel hood in an elevated position.

2. The skate cart as claimed in claim 1, wherein said rear wheel hood has an inside surface which does not engage said rear wheel, and a second curved wheel engaging inside surface (311).

3. A skate cart, comprising a frame, a front wheel and a rear wheel respectively connected to two ends of said frame, a handlebar assembly operationally connected to said front wheel, and
   a rear wheel hood pivotally connected to said frame, a resilient member having one end thereof connected to said rear wheel hood and the other end of said resilient member connected to said frame,
   wherein said frame has a hole defined therein and said resilient member is connected to said frame by a bolt extending through said resilient member and threadedly engaged with said hole in said frame.

4. The skate cart as claimed in claim 1 further comprising a limiting end on a rear end of said frame.

5. The skate cart as claimed in claim 3, wherein said rear wheel hood has an inside surface which does not engage said rear wheel, and a second curved wheel engaging inside surface (311).

6. A skate cart comprising a frame, a front wheel and a rear wheel respectively connected to two ends of said frame, a handlebar assembly operationally connected to said front wheel, a rear wheel hood pivotally connected to said frame, and
    a resilient member having one end thereof operatively connected to said rear wheel hood and the other end of said resilient member connected to said frame, wherein said resilient member is curved with said one end thereof extending upwardly and abutting an interior surface of said rear wheel hood, whereby said rear wheel hood has an unnconnected rear end which is biased upwardly by said resilient member.

7. The skate cart as claimed in claim 6, wherein said rear wheel hood has an inside surface which does not engage said rear wheel, and a second curved wheel engaging inside surface (311).

\* \* \* \* \*